United States Patent
Ahn et al.

(10) Patent No.: US 12,515,592 B1
(45) Date of Patent: Jan. 6, 2026

(54) RECONFIGURABLE VEHICLE DOOR PANEL SYSTEM

(71) Applicant: GM GLOBAL TECHNOLOGY OPERATIONS LLC, Detroit, MI (US)

(72) Inventors: Ki Hyun Ahn, Lake Orion, MI (US); Joseph F. Szczerba, Grand Blanc, MI (US); Bobin Kil, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/823,407

(22) Filed: Sep. 3, 2024

(51) Int. Cl.
  *B60R 7/04* (2006.01)
  *B60J 5/04* (2006.01)
  *B60N 2/30* (2006.01)
  *B60N 3/00* (2006.01)

(52) U.S. Cl.
  CPC ............ *B60R 7/046* (2013.01); *B60J 5/0413* (2013.01); *B60N 2/3038* (2013.01); *B60N 3/001* (2013.01)

(58) Field of Classification Search
  CPC ...... B60N 3/001; B60N 2/3038; B60J 5/0413; B60R 7/046
  USPC ...................................................... 296/37.13
  See application file for complete search history.

(56) References Cited

U.S. PATENT DOCUMENTS

| | | | |
|---|---|---|---|
| 6,145,919 A | 11/2000 | Mysliwiec et al. | |
| 7,469,948 B2* | 12/2008 | Karuppaswamy | B60R 5/041 296/26.08 |
| 10,328,860 B2* | 6/2019 | Lewis | B60J 5/105 |
| 10,351,067 B2* | 7/2019 | Koo | B60R 11/02 |
| 10,427,612 B2 | 10/2019 | Akdag Cakir et al. | |
| 10,889,223 B2* | 1/2021 | Pascarella | B62D 33/0273 |
| 11,491,919 B2* | 11/2022 | Westfall | B60R 7/046 |
| 2006/0266779 A1 | 11/2006 | Mozer et al. | |
| 2017/0313229 A1* | 11/2017 | Isernio | B60N 2/78 |
| 2023/0038501 A1 | 2/2023 | Kim et al. | |
| 2024/0375492 A1* | 11/2024 | Deng | B60R 7/046 |

FOREIGN PATENT DOCUMENTS

DE 102022110095 A1 10/2023
JP 10278587 A 10/1998

* cited by examiner

*Primary Examiner* — Marcus Menezes
(74) *Attorney, Agent, or Firm* — Ingrassia Fisher & Lorenz, LLP | IF&L

(57) ABSTRACT

A reconfigurable vehicle door trim panel system. A vehicle has a body defining an exterior and an interior with a door that opens to expose the interior to the exterior. When closed, the door has an interior side and an exterior side. A panel is provided on the interior side of the door. A linkage connects the panel to the door. The panel is configured to move, via the linkage, from a position stowed in the door to a position deployed from the door. When in the stowed position, the panel is configured to provide the interior side of the door with a uniform appearance. When in the deployed position, the panel is configured to serve a functional purpose.

20 Claims, 4 Drawing Sheets

RECONFIGURABLE VEHICLE DOOR PANEL SYSTEM

INTRODUCTION

The technical field generally relates to vehicle panel systems, and more particularly relates to reconfigurable interior trim panel systems of vehicle doors capable of serving various functions.

A vehicle may have outer body panels that define an exterior styling surface and interior panels and components that define the space within which occupants reside. Interior panels and components are often designed to provide an aesthetically pleasing appearance. Sometimes these panels and components serve static functions such as cupholders, handles and armrests. Other times the panel or component may have limited means of movement, such as in the case of a sun visor, that is rotatable to a preferred position to best serve the desire of the driver.

As vehicles and customer expectations evolve, providing new or additional functionality for passengers may become more desirable. For example, with in-car internet access, the ability to use electronic devices expands. With autonomous vehicles, the ability of passengers to engage in various activities may become greater. The panels and components of the vehicle may provide opportunities to better serve the expectations of vehicle users, such as by being redesigned without past limitations inhibiting the expansion of available functions.

Accordingly, there is an ongoing desire for systems that provide new and useful functional aspects in vehicles. In addition, it is preferable if the systems are capable of providing multiple functions. Furthermore, other desirable features and characteristics of the present disclosure will become apparent from the subsequent detailed description and the appended claims, taken in conjunction with the accompanying drawings and the foregoing introduction.

SUMMARY

In a number of embodiments, a vehicle has a body defining an exterior and an interior with a door that opens to expose the interior to the exterior. As defined when closed, the door has an interior side and an exterior side. A panel is provided on the interior side of the door. A linkage connects the panel to the door. The panel is configured to move, via the linkage, from a position stowed in the door to a position deployed from the door. When in the stowed position, the panel is configured to provide the interior side of the door with a uniform appearance. When in the deployed position, the panel is configured to serve one or more functional purposes.

In additional embodiments, the panel includes an interior trim surface of the door.

In additional embodiments, the panel has two sides and when in the deployed position, the panel alternately displays either side facing upward.

In additional embodiments, a linkage connects the panel with the door, and the linkage includes a slide.

In additional embodiments, when in the deployed position, the panel is moveable vertically.

In additional embodiments, when being moved from the stowed position to the deployed position, the panel is rotatable.

In additional embodiments, the panel has one side covered with a trim material and another side formed of a rigid material.

In additional embodiments, the door is one door of the vehicle and the vehicle has at least one other door a second door. The panel on the one door is reconfigurable from an interior trim panel to present a work surface. The other door includes another panel reconfigurable to a seat surface.

In additional embodiments, a lock is included to hold the door in a selected open position relative to the vehicle.

In additional embodiments, the panel, when in the deployed position, is a foundation platform for multi-purpose reconfigurable uses.

In a number of other embodiments, vehicle has a body defining an exterior and an interior. A door is selectively openable to expose the interior to the exterior. The door has an interior side and an exterior side. A panel system has a panel on the interior side of the door. The panel system defines an interior trim system of the door. A linkage connects the panel to the door. The panel is moveable, via the linkage, from a stowed position in the door to a deployed position moved away from the door. When in the stowed position, the panel functions to provide the interior side of the door with a uniform appearance. When in the deployed position, the panel operates as a platform to serve a functional purpose.

In additional embodiments, the panel is an interior trim panel of the door presenting a uniform appearance when in the stowed position.

In additional embodiments, the panel has to sides and, when in the deployed position, the panel operates to alternately display one side with a rigid surface facing upward or the other side with a pliable surface facing upward.

In additional embodiments, a linkage connects the panel with the door, and the linkage includes two slides.

In additional embodiments, when in the deployed position, the panel is moveable vertically to various select heights relative to the door.

In additional embodiments, when moving from the stowed position to the deployed position, the panel is rotatable at least ninety degrees.

In additional embodiments, the panel has one side formed of a non-rigid trim material and another side formed of a rigid material.

In additional embodiments, the door is one door of the vehicle, which includes another door. The panel on the one door is reconfigurable from an interior trim panel to a table. The other door includes another panel reconfigurable to a seat.

In additional embodiments, the panel, when in the deployed position, operates as a foundation platform for multi-purpose reconfigurable uses including as a seat, or as a work surface.

In a number of other embodiments, a vehicle has body defining an exterior and an interior. A door selectively opens the body to expose the interior to the exterior. The door has an interior side and an exterior side. A panel system has a panel on the interior side of the door. The panel system defines an interior trim system of the door. A linkage connects the panel to the door. The linkage operates to allow the panel to rotate and to move relative to the door. The panel functions to move, via the linkage, from a stowed position in the door to a deployed position moved away from the door. When in the stowed position, the panel operates to provide the interior side of the door with a uniform trim appearance. When in the deployed position, the panel operates as a platform to serve a functional purpose. When in the deployed position, a cavity is exposed in the door into which the panel is stowable.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
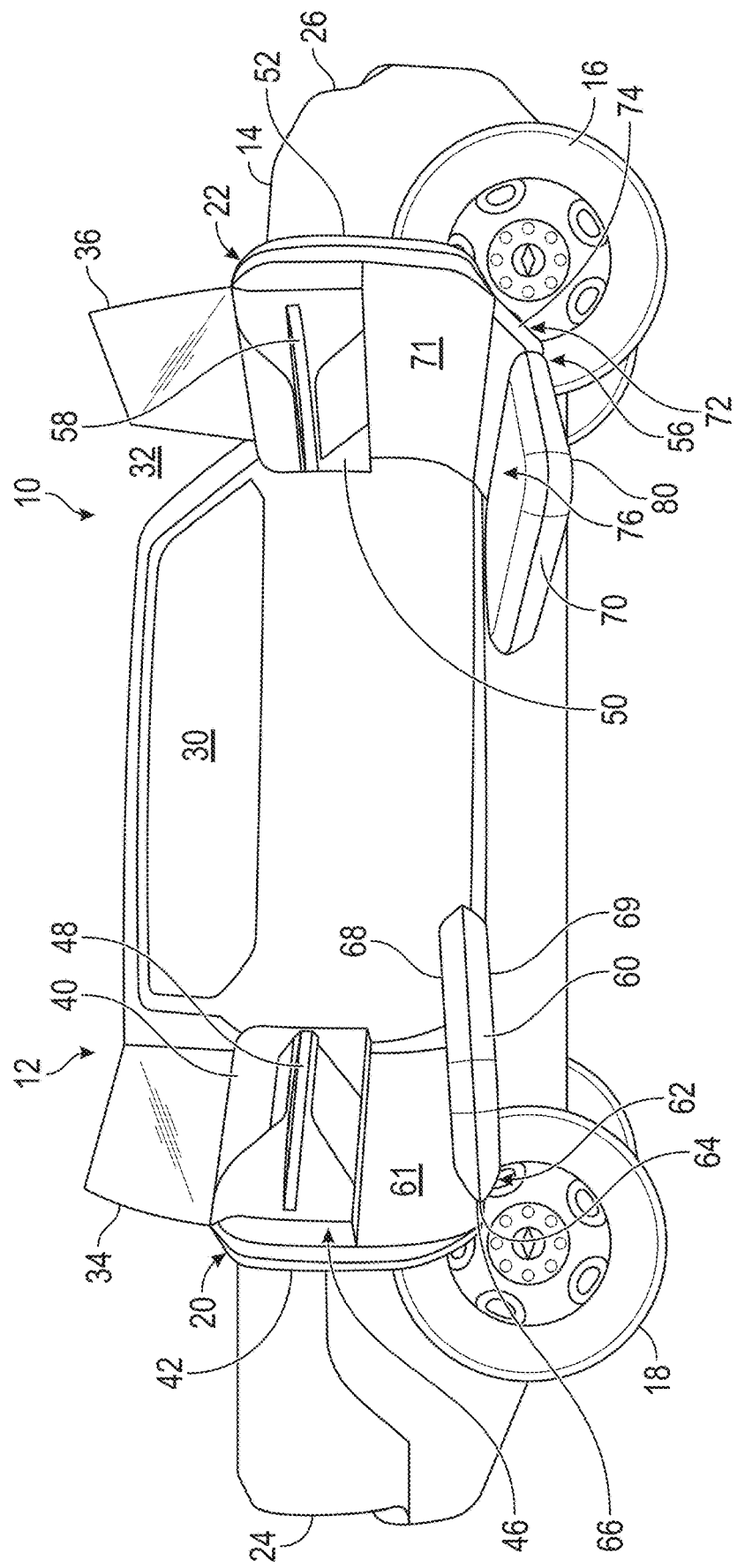
FIG. 1 is a schematic illustration of a vehicle with open doors having a reconfigurable vehicle door panel system, in accordance with various embodiments.

FIG. 1 illustrates a vehicle 10, according to an embodiment. In certain examples, the vehicle 10 comprises an automobile. The vehicle 10 may include a reconfigurable vehicle door panel system 12 that enables components that are integrated, moveable, and reconfigurable to provide additional and alternate uses for the vehicle interior door trim panel as further described below. In a number of embodiments, the reconfigurable vehicle door panel system 12 may be used in a variety of environments, such as those with forward opening doors, rearward opening doors, or other configurations.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a body 14, front wheels 16, and rear wheels 18. The body 14 is carried on the wheels 16, 18 by a chassis and substantially encloses components of the vehicle 10. The wheels 16, 18 are all rotationally coupled to the vehicle 10 near a respective corner of the body 14. The vehicle 10 may further include a propulsion system (not shown). The propulsion system may include an engine and/or motor such as an internal combustion engine (e.g., a gasoline or diesel fueled combustion engine), an electric motor (e.g., a 3-phase AC motor), or a hybrid system that includes more than one type of engine and/or motor.

The vehicle 10 includes a number of doors including doors 20, 22. In this embodiment, the doors 20, 22 are hinged to the body 14 on one of their vertically disposed sides to swing outward when opened. In other embodiments, the doors 20, 22 may operate in a different way. The door 20 opens rearward toward the rear 24 of the vehicle 10 and the door 22 opens forward toward the front 26 of the vehicle 10. The doors 20, 22, when opened, each expose the interior 30 of the vehicle 10 to the exterior 32 of the vehicle 10. In this embodiment, the doors 20, 22 have windows 34, 36 respectively.

The door 20 has an interior side 40 and an exterior side 42. The interior side 40 is defined by a panel system 46 that may include any number of panels or panel sections. In this embodiment, the panel system 46 includes a handle 48 for opening and closing the door 20. The handle 48 may be considered a part of a panel and/or of the panel system 46. The exterior side 42 of the door 20 is defined by an exterior styling surface that is designed for environmental exposure. Similarly, the door 22 has an interior side 50 and an exterior side 52. The interior side 50 is defined by a panel system 56 that may include any number of panels or panel sections. In this embodiment, the panel system 56 includes a handle 58 for opening and closing the door 22. The handle 58 may be considered a part of a panel and/or of the panel system 56. The exterior side 52 is defined by an exterior styling surface that is designed for environmental exposure.

For the purposes of this disclosure and of the claims hereof, a "panel" as used herein is not limited to a flat or substantially flat component but is any component or a section thereof that is a part of the definition of the interior 30 of the vehicle 10. Accordingly, a panel may be contoured, curved, flat or a combination thereof. A panel may have various features, may have one or plural parts, and may be made of one or plural materials. For example, a panel may be a part of the interior trim that defines, at least in part, a portion of the interior of the vehicle 10 and that is reconfigurable into a seat, back rest, arm rest, footrest, head rest, and other seating features, table, platform, foundation, step, or other functional feature.

In the current embodiment, the panel system 46 includes a reconfigurable panel 60 that is connected with the door 20 by a linkage system 62. In this embodiment, the linkage system 62 is a hinge 64 along a side 66 of the reconfigurable panel 60. The linkage system 62 allows the panel 60 to rotate about the side 66 so that the panel 60 is disposed substantially horizontal. This leaves a cavity 61 in the door 20 into which the panel 60 is stowable. The linkage system allows the panel 60 to rotate at least ninety degrees, such as at least one-hundred-eighty degrees. As such, the panel 60 provides a work surface 68, which may be used for one or multiple purposes, such as a countertop, a desk, a platform, or a step. The work surface 68 may be made of a material such as hard/rigid plastic such as polyethylene, high-density polyethylene, polyethylene terephthalate, polyvinyl chloride, metal, etc. that provides a platform suitable for performing work or other activities upon. For example, with the panel 60 in a deployed position as shown, the work surface 68 may be used to place an electronic device, writing pad, or other functional device thereupon. The panel 60 has a surface 69 that faces the interior 30 of the vehicle 10 when the panel 60 is not deployed (stowed). The surface 69 of the panel 60 may be made of a material such as an interior trim material that is pliable (not rigid), such as fabric or leather (natural or synthetic). The panel 60 may comprise only a portion of the interior of the door 20.

Also in the current embodiment, the panel system 56 includes a reconfigurable panel 70 that is connected to the door 22 by a linkage system 72. The linkage system 72 has at least one link 74 that is coupled with the door 22 and with the panel 70 to enable the panel 70 to deploy by rotating and moving downward and/or outward relative to the door 22. This leaves a cavity 71 in the door 22 into which the panel 70 is stowable. When deployed, the panel 70 presents a seating surface 76 that is made of a trim material such as fabric or leather, which may be padded for comfort. The seating surface 76 may face and be exposed to the interior 30 of the vehicle 10 when the panel 70 is stowed. The seating surface 76 may be deployed to a height that is lower than the height of the work surface 68 so that an individual may sit on the panel 70 while working on the panel 60. The panel 70 may comprise only a portion of the interior of the door 22. In embodiments, the panels 60, 70 may be deployed in reversible states so that either may present alternatively a work surface or a seating surface.

Figure 4:
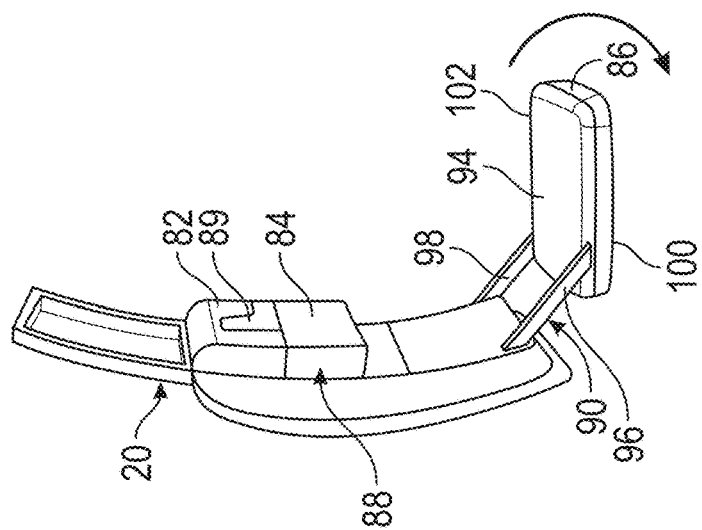
FIG. 4 is a schematic illustration of a door of the vehicle of FIG. 1 with the reconfigurable vehicle door panel system in a second deployed state, in accordance with various embodiments.
Figure 3:
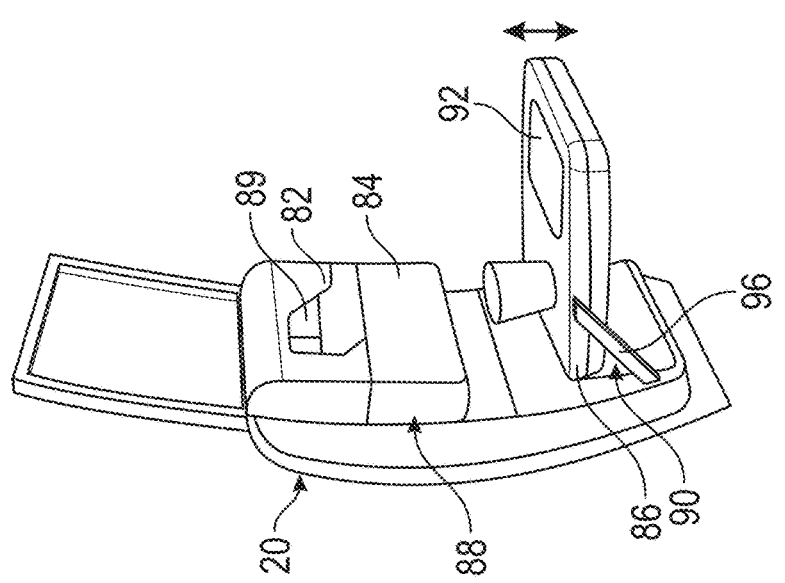
FIG. 3 is a schematic illustration of a door of the vehicle of FIG. 1 with the reconfigurable vehicle door panel system in a first deployed state, in accordance with various embodiments.
Figure 2:
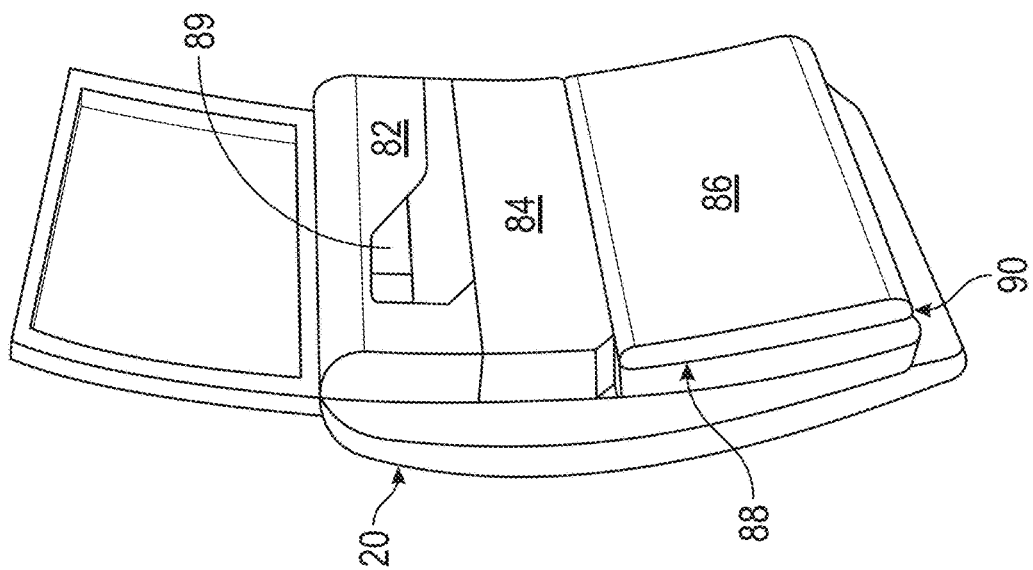
FIG. 2 is a schematic illustration of a door of the vehicle of FIG. 1 with the reconfigurable vehicle door panel system in a stowed state, in accordance with various embodiments.

Referring to FIGS. 2-4, with continued reference to FIG. 1, an exemplary embodiment, which may be the same as, or different than, the embodiment of FIG. 1, is illustrated in a stowed position in FIG. 2, in a first deployed position in FIG. 3 and in a second deployed position in FIG. 4. As shown in FIG. 2, the door 20 includes an interior side 80 with a panel 82, a panel 84 and a panel 86 collectively in a panel system 88. The interior side 80 presents a substantially continuous/uniform appearance, meaning without large/substantial projections into the interior 30 and without large/substantial gaps. Uniform means generally consistent in appearance and like an interior trim panel system. The panel 82 includes a handle 89 for opening the door 20.

The panel system 88 includes a linkage system 90. The linkage system 90 includes two links that enable the panel 86 to be deployed in various reconfigurable states. As shown in FIG. 3, the panel 86 is deployed in the first deployed position presenting a work surface 92 facing upward. The work surface 92 is hidden within the door 20 in the stowed position of FIG. 2. The linkage system 90 enables the panel 86 to rotate and move upward (and/or downward), relative to the door 20 when deployed. As shown in FIG. 4, the panel 86 is deployed in the second deployed position presenting a seating surface 94 facing upward. The seating surface 94 faces the interior 30 when in the stowed position of FIG. 2. The linkage system 90 enables the panel 86 to rotate and move downward (and/or upward), relative to the door 20 when deployed. The linkage system 90 includes at least two links 96 and 98, each of which couples with the door 20. The link 96 couples with a side 100 of the panel 86 and the link 98 couples with an opposite side 102 of the panel 86. Accordingly, the panel system 88 enables a multi-purpose reconfiguration of the panel 86 that provides multiple functions including as the work surface 92 and as the seating surface 94, collectively referred to as platforms or foundations.

Figure 6:
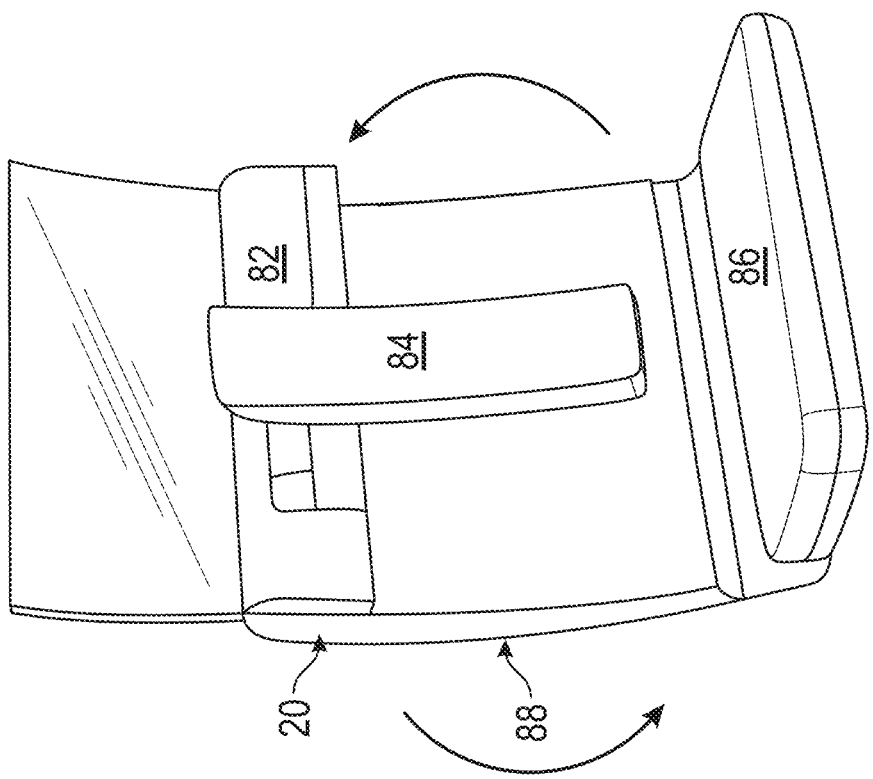
FIG. 6 is a schematic illustration of a door of the vehicle of FIG. 1 with the reconfigurable vehicle door panel system in a fourth deployed state, in accordance with various embodiments.
Figure 5:
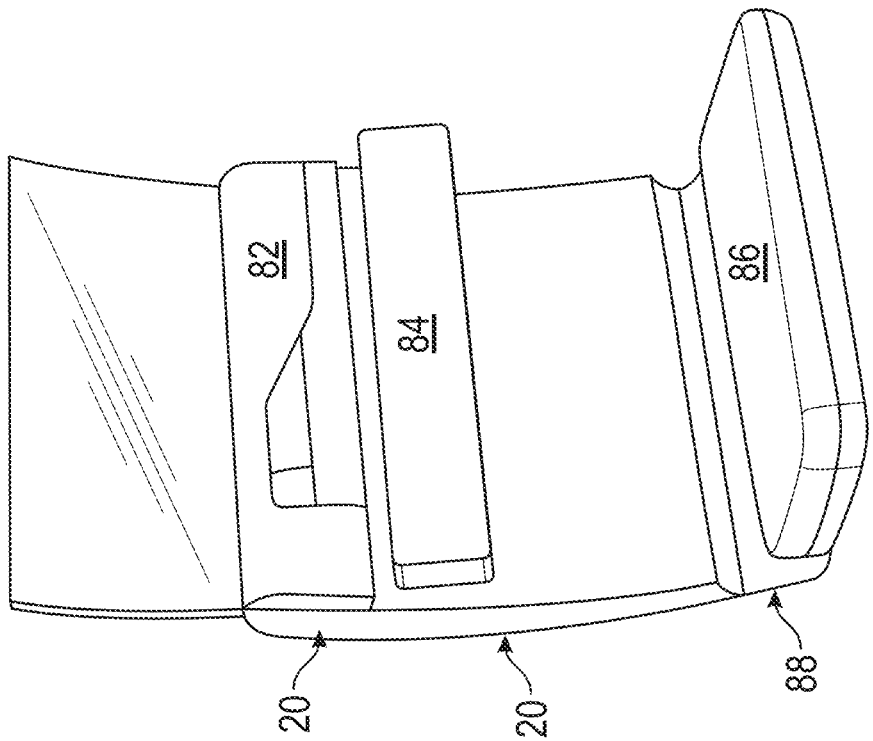
FIG. 5 is a schematic illustration of a door of the vehicle of FIG. 1 with the reconfigurable vehicle door panel system in a third deployed state, in accordance with various embodiments.

Referring additionally to FIGS. 5 and 6, the panel system 88 enables the panel 84 to be deployed by popping out from the door 20 and rotating at least ninety degrees. For example, a spring loaded rotatable mechanism may connect the panel 84 to the door 20. As shown in FIG. 5, the panel 84 is stowed in the door 20 presenting the interior side 80 in a substantially continuous/uniform state at the interior of the door 20. When in the deployed position of FIG. 6, with the panel 86 presenting the seating surface 94, the panel 84 may be disposed above the panel 86 and at a closer position to the door 20 relative to the panel 86 to serve as a backrest for an individual seated on the panel 86. The panel 84, or the panel 86 may be deployed as a seat, back rest, arm rest, footrest, head rest or other feature.

Figure 7:
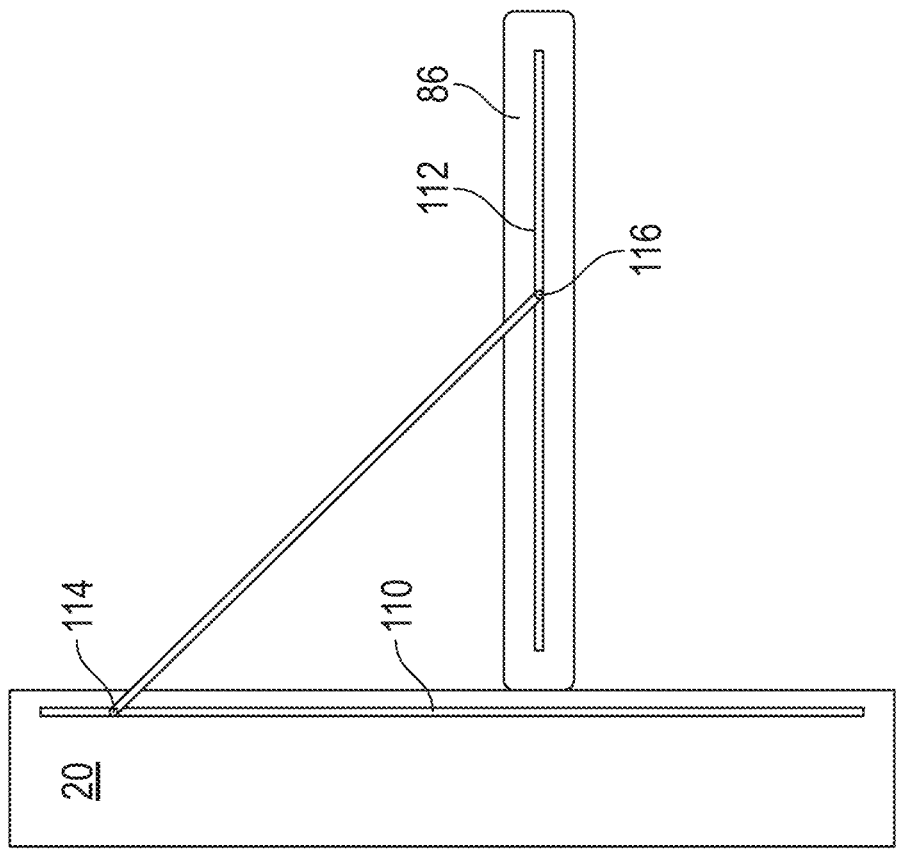
FIG. 7 is a schematic illustration including a linkage of the reconfigurable vehicle door panel system of FIG. 1, in accordance with various embodiments.

Referring additionally to FIG. 7, the linkage system 90 includes the link 96 that is coupled with the door 20 and with the panel 86. A track 110 is provided on the door 20 and a track 112 is provided on the panel 86. The link 96 may include plural articulating sections in various other embodiments to increase the maneuverability of the panel 86. A slide 114 is connected with the link 96 and is engaged in the track 110. The slide 114 is moveable to various heights within the track 110 to deploy and position the panel 86. A slide 116 is connected with the link 96 and is engaged in the track 112. The slide 114 is moveable within the track 112 to deploy the panel 86 to various deployed positions and to enable the panel to flip/rotate to present either the work surface 92 or the seating surface 94 facing upward. When used as a table, the linkage system 90 allows the panel 86 to slide toward and away from the door 20 for desirable positioning with the slide 116 moving along the track 112. The panel 86 may be deployed to various heights such as for use while seated or while standing. As such, the panel system 88 enables a multi-purpose reconfiguration of the panel 86 that provides multiple functions/platforms. In other embodiments, the platforms/panels may provide other functions. For example, the panel 86 may be configured to support an enclosure, such as a side tent that extends the space of the interior 30 to a living space adjacent to the vehicle.

Figure 8:
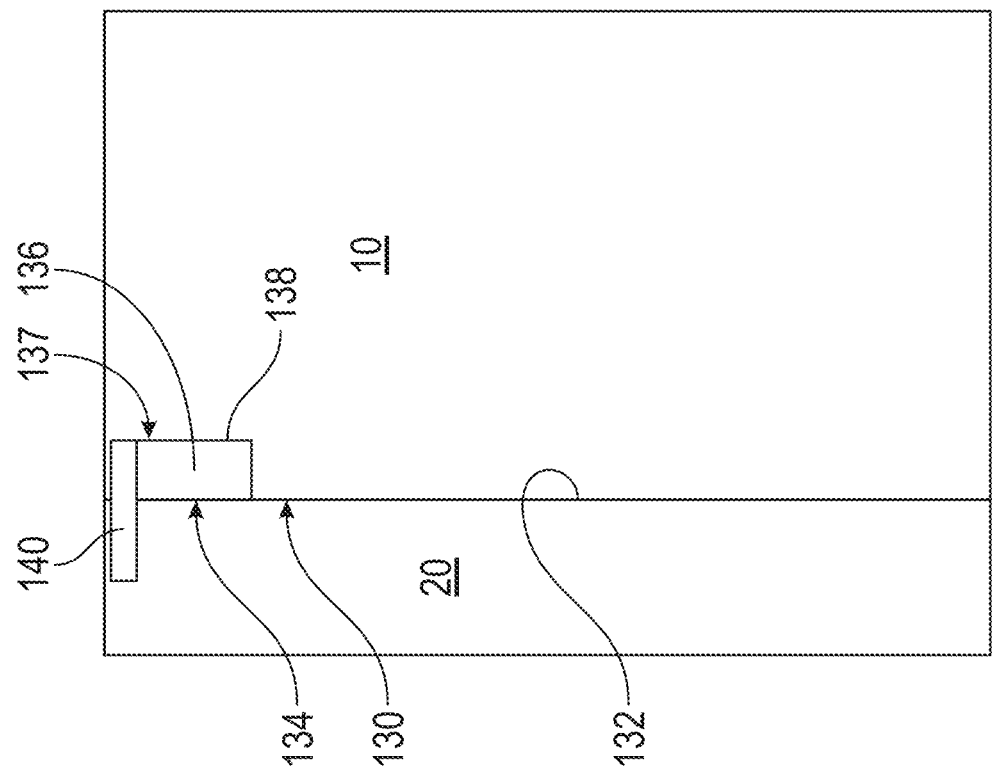
FIG. 8 is a schematic illustration including a hinge-hold lock of the door of the vehicle of FIG. 1.

Referring additionally to FIG. 8, the door 20 is connected with the body 14 of the vehicle 10 by a hinge system 130 including at least one hinge 132. The hinge system 130 includes a hinge hold feature 134 including a lock 136 to hold the door 20 in a variety of selected open positions relative to the vehicle 10. In the current embodiment, the hinge hold feature 134 is a part of a drive system 137 that includes a motor 138 with a torque rod 140 connected with the door that drives the door 20 open and closed. In various embodiments, the torque rod 140 may be another form of torque transfer element, such as a gearbox, to transfer torque from the motor 138 to rotate the door. As such, stopping the motor 138 at a desired position of the door 20 effects the hinge hold feature 134/lock 136 to lock the door 20 in position for use of the platform/panel 86 for its intended function without the door 20 moving. For example, the panel 86 may be configured as a seat, a table, a step, such as for ingress and egress of the vehicle 10, and/or as a platform foundation for other uses.

Accordingly, a multi-functional and reconfigurable vehicle door panel system enables a variety of panel deployments for useful purposes. The panel may be a platform for a wide range of purposes providing additional and alternate uses for the vehicle interior door trim panel. The panel may be deployed when the door is open or closed. The system is capable of reconfiguring a door interior trim panel into a desk, table, seat, step, foundation, or other platform. Folding linked hinges and sliding and rotating mechanisms may be employed to reconfigure the door interior trim panel for various uses. The system may be reconfigured to provide functions to users in parked outside use cases such as tailgating, camping or working. The door trim panel may have different material on each side (i.e., soft material on one side that is used for seating and hard material on other side that is used for table/desk). The system may have multiple components where one portion is reconfigured into a seat bottom and other elements are reconfigured into a back rest, arm rest, footrest, head rest, and other seating features. When used as a table/desk components may be further adjusted in height for a seated table height or a standing table height, and/or extend/angle table surface. Vehicle door hinges may have a lock feature to stabilize the door for seating/eating/working. The system may be used on forward or rearward or otherwise opening doors.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle having a body defining an exterior and an interior and comprising:
   a door that selectively opens to expose the interior to the exterior, wherein the door has an interior side and an exterior side;
   a panel system with a panel on the interior side of the door; and
   a linkage connecting the panel to the door,
   wherein the panel is configured to move, via the linkage, from a stowed position in the door to a deployed position moved away from the door,
   wherein, when in the stowed position, the panel is configured to provide at least a part of the interior side of the door that is substantially continuous and, when in the stowed position, the panel includes a first side facing into the door and a second side on an opposite side of the panel from the first side and facing outward from the door,
   wherein the panel, when in the deployed position, is reversible between a first state where the first side faces up and the second side faces down, and a second state where the second side faces up and the first side faces down,
   wherein, when in the deployed position, the panel is configured to serve a functional purpose, including presenting as a work surface when the first side faces up in the first state and presenting as a seating surface when the second side faces up in the second state.

2. The vehicle of claim 1, wherein the panel is rotatable at least one-hundred-eighty degrees.

3. The vehicle of claim 1, wherein the panel, when in the deployed position and via the linkage, is slidable toward and away from the door.

4. The vehicle of claim 1, wherein the linkage includes a link connected with a first slide and a second slide, wherein the first slide is disposed in a first track on the door and the second slide is disposed in a second track on the panel.

5. The vehicle of claim 1, comprising a track connecting the panel to the door, wherein when in the deployed position, the panel is moveable vertically to various heights within the track with the panel deployed and positionable in one of a number of horizontal positions at the various heights.

6. The vehicle of claim 1, wherein the panel comprises a seat and comprising a second panel that is stowed in the door and that comprises a backrest above the seat when deployed by popping straight out of the door separate from deployment of the panel.

7. The vehicle of claim 1, wherein the first side is covered with a trim material and the second side is formed of a material selected for work functionality.

8. The vehicle of claim 1, wherein:
   the door is a first door and the vehicle comprises a second door,
   the panel is a first panel, and
   the second door includes a second panel reconfigurable from an interior trim panel to a seat surface,
   wherein, when the first panel is configured to present the work surface, the seat surface is configured for sitting on when simultaneously working on the work surface.

9. The vehicle of claim 1, comprising a lock configured to hold the door in a selected open position relative to the vehicle.

10. The vehicle of claim 1, wherein the panel, when in the deployed position, is configured as a foundation platform for multi-purpose reconfigurable uses.

11. A vehicle having a body defining an exterior and an interior and comprising:
    a door that selectively opens to expose the interior to the exterior, wherein the door has an interior side and an exterior side;
    a panel system with a panel on the interior side of the door, the panel system defining an interior trim system of the door; and
    a linkage connecting the panel to the door,
    wherein the panel is configured to move, via the linkage, from a stowed position in the door to a deployed position moved away from the door,
    wherein, when in the stowed position, the panel is configured to provide the interior side of the door that is substantially continuous and, when in the stowed position, the panel includes a first side facing into the door and a second side on an opposite side of the panel from the first side and facing outward from the door,
    wherein the panel, when in the deployed position, is reversible between a first state where the first side faces up and the second side faces down, and a second state where the second side faces up and the first side faces down,
    wherein, when in the deployed position, the panel is configured as a platform to serve a functional purpose, including presenting as a work surface when the first side faces up in the first state and presenting as a seating surface when the second side faces up in the second state.

12. The vehicle of claim 11, wherein the panel is rotatable at least one-hundred-eighty degrees.

13. The vehicle of claim 11, wherein the panel, when in the deployed position and via the linkage, is slidable toward and away from the door.

14. The vehicle of claim 11, wherein the linkage includes a link connected with a first slide and a second slide, wherein the first slide is disposed in a first track on the door and the second slide is disposed in a second track on the panel.

15. The vehicle of claim 11, wherein when in the deployed position, the panel is moveable in a track vertically to various select heights relative to the door with the panel deployed and positionable in one of a number of horizontal positions at the various select heights.

16. The vehicle of claim 11, wherein the panel comprises a seat and comprising a second panel that is stowed in the door and that comprises a backrest above the seat when deployed by popping straight out of the door separate from deployment of the panel.

17. The vehicle of claim 11, wherein the first side is formed of a trim material and the second side is formed of a material selected for work functionality.

18. The vehicle of claim 11, wherein:

the door is a first door and the vehicle comprises a second door, the panel is a first panel, the second door includes a second panel reconfigurable from an interior trim panel to a seat surface, and when the first panel is configured to present the work surface, the seat surface is configured for sitting on when simultaneously working on the work surface.

19. The vehicle of claim 11, wherein the panel, when in the deployed position, is configured as a foundation platform for multi-purpose reconfigurable uses including as a seat and as a table.

20. A vehicle having body defining an exterior and an interior and comprising:

a door that is selectively opens the body to expose the interior to the exterior, wherein the door has an interior side and an exterior side, wherein the door is a side door of the vehicle;

a panel system with a panel on the interior side of the door, the panel system defining an interior trim system of the door; and a linkage connecting the panel to the door, the linkage configured to allow the panel to rotate and to move relative to the door, wherein the panel is configured to move, via the linkage, from a stowed position in the door to a deployed position moved away from the door, wherein, when in the stowed position, the panel is configured to provide the interior side of the door with a substantially continuous trim appearance, wherein, when in the deployed position, the panel is configured as a platform to serve a functional purpose, wherein, when in the deployed position, a cavity is exposed in the door into which the panel is stowable, wherein a seat back is stowed in the door above the cavity and is deployable straight out of the door and is deployable separate from the panel.

* * * * *